Patented Feb. 17, 1953

2,628,922

UNITED STATES PATENT OFFICE 2,628,922

ADHESION OF POLYMERIC MATERIALS TO GLASS

Frank J. Carlin, Fort Atkinson, Wis., assignor to United States Rubber Company, New York, N. Y., a corporation of New Jersey No Drawing. Application November 9, 1950, Serial No. 194,929

10 Claims. (Cl. 117—124)

The invention relates to a method and composition for securing improved adhesion of certain organic polymeric materials to glass surfaces, and further relates to certain novel, unsaturated organic polymer compositions which are useful for this purpose. In particular, my invention comprises applying to a glass surface a coating comprising a mixture of xylene-soluble unsaturated polymer of a 2-alkenyl ester or a 2-alkenyloxyalkyl ester containing two or more ethylenic linkages, or a copolymer containing at least 20% of such ester, and a minor amount of ammonium fluoride or bifluoride, and thereafter heating to secure a coating which is characterized by its exceptional adhesion to the glass.

Industry has long sought a satisfactory organic coating material for glass surfaces, particularly for printing, labeling and decorating glass containers for use by the food, chemical, medical and allied trades. However, the requirements of heat-stability and solvent-resistance have precluded the use of virtually all types of thermoplastic resins for securing a permanent coating, while none of the organic resins of the thermosetting type has proven entirely satisfactory with regard to the additional requirement that the coatings possess a high degree of adhesion to the glass. Satisfactory adhesion entails not only stability under ordinary mechanical handling and packaging techniques but outstanding resistance to deterioration under the washing, scrubbing and heat sterilization processes to which such articles are frequently subjected. Under such conditions conventional coatings soon crack, craze, chip and/or flake off whereby the useful life of the coated glass article is measurably shortened and frequent renewal of the original coating becomes necessary.

To overcome these notable deficiencies, the art has introduced various pre-treatments of the glass surface, prior to application of the coating resin. Such pre-treatments have involved the use of alkali metal silicates or bichromates or hydrofluoric acid. Some improvement in adhesion can be attained by using such pre-treated glass although performance of the films under service conditions tends to be somewhat erratic and even unpredictable. Moreover, many of the chemicals employed in such pre-treatment of the glass entail additional expense in processing and equipment. This is particularly true of hydrofluoric acid whose corrosive nature necessitates the use of special materials in the construction of ovens, ventilating equipment, etc., and likewise requires special precautions to minimize the technical and health hazards attendant upon its use. Moreover, the etching action of hydrofluoric acid on glass is difficult to control accurately with respect to uniformity and this in turn may affect the applied organic coating deleteriously.

My discovery circumvents the above mentioned disadvantages and indeed eliminates the need for a specially pretreated glass entirely. Instead, ordinary commercial grades of glass are simply coated by conventional methods with my mixture of an unsaturated resin derived from 2-alkenyl esters or 2-alkenyloxyalkyl esters, containing two or more ethylenic linkages, and a minor amount; e. g., from 0.05% to 5.0%, of ammonium fluoride or bifluoride, and thereafter baked at temperatures of from about 120° C. to 250° C. to secure highly adherent surface films which are very resistant to solvents and heat.

The ammonium fluorides employed in my invention are unique in their action since the corresponding alkali metal fluorides, e. g., sodium fluoride and sodium bifluoride, display little or none of the adhesive improvement accomplished by my fluoride salts.

The unsaturated polymeric materials employed in my invention are xylene-soluble polymers and copolymers derived from 2-alkenyl and 2-alkenyloxyalkyl esters which contain a total of two or more, particularly two to four, ethylenic linkages. A particularly suitable class of such esters are those of 2-alkenols and 2-alkenyloxyalkanols of the formula R*CH=CR*—CH$_2$—X in which one R* is hydrogen and the other R* is a radical selected from the group consisting of hydrogen, chlorine, methyl, ethyl and phenyl, and X is a radical selected from the group consisting of the hydroxyl radical and hydroxyalkoxy radicals of the formula —O—CHR$^\phi$—CHR$^\phi$—OH wherein R$^\phi$ is a radical selected from the group consisting of hydrogen and alkyl (e. g., methyl, ethyl, propyl, butyl, amyl, hexyl, heptyl, octyl). Such alcohols can be esterified with olefinic monocarboxylic acids (i. e., alkenoic acids, preferably the 2-alkenoic acids of the general formula R*CH=CR*—COOH, in which R* is as defined above (e. g., acrylic, methacrylic, ethacrylic, chloroacrylic, crotonic, and cinnamic acids), with saturated polybasic acids (e. g., oxalic, malonic, alpha-methylmalonic, succinic, glutaric, adipic, pimelic, azelaic, with phthalic acid (which is especially preferred), with olefinic polybasic acids (especially the alpha-olefinic acids, e. g., fumaric, itaconic, maleic, citraconic, mesaconic, aconitic acids), and with inorganic polybasic acids (e. g., carbonic, sulfuric, phosphoric, silicic, stannic, titanic acids) to yield polyolefinic esters, which, upon subsequent polymerization to the xylene-soluble state, are suitable starting materials for the present invention. The allyl-type esters (allyl, methallyl and ethallyl esters) are preferred because of favorable cost and availability.

A representative list of such esters includes allyl acrylate, allyl methacrylate, beta-allyloxyethyl acrylate, chloroallyl acrylate, allyl chloroacrylate, allyl ethacrylate, methallyl cinnamate, allyl crotonate, crotyl acrylate, diallyl fumarate, dimethylallyl fumarate, di-beta-allyloxyethyl fumarate, di-beta-methallyloxyethyl fumarate, diallyl itaconate, di-beta-allyloxyethyl itaconate, dimethallyl maleate, diallyl citraconate, dimethallyl citraconate, triallyl aconitate, diallyl oxalate, diallyl succinate, dichloroallyl adipate, dicrotyl succinate, dimethallyl adipate, di-beta-allyloxyethyl adipate, diallyl phthalate, dimethallyl phthalate, di(chloroallyl)phthalate, di-beta-allyloxyethyl phthalate, triallyl carballylate, diallyl carbonate, diallyl sulfate, triallyl phosphate, trimethallyl phosphate, tri-beta-allyloxyethyl phosphate, tetrallyl silicate, tetramethallyl stannate, and tetrallyl titanate. Crude 2-alkenoxyalkyl esters, from an alkanol, an oxirane and an olefinic acid may be used as monomers instead of the purified esters in making soluble copolymers for use in coating glass by my new process.

Polymers derived from such crude or purified esters can be modified, e. g., with respect to hardness, dielectric strength, flexibility and solvent compatibility by interpolymerization of the above allylic esters, or mixtures thereof, with one or more copolymerizable monoolefinic compounds such as:

(a) Aryl-substituted vinyl-type compounds (e. g., styrene, alpha-methylstyrene, p-methylstyrene, alpha,p-dimethylstyrene, p-chlorostyrene, p-cyanostyrene, alpha-vinylpyridine and vinylnaphthalene);

(b) Olefinic acids and derivatives hydrolyzable thereto (e. g., acrylic acid, methyl acrylate, 2-ethylhexyl acrylate, methyl methacrylate, tolyl acrylate, benzyl acrylate, methyl alpha-chloroacrylate, acrylamide, N-methylacrylamide, methyl methacrylamide, methyl alpha-ethylacrylate, ethyl alpha-chloroacrylate, acrylonitrile, methacrylonitrile, acrylyl fluoride, diethyl maleate, diethyl fumarate, dimethyl itaconate, di-2-ethylhexyl itaconate, and fumacronitrile);

(c) Vinyl ethers and esters (e. g., methyl vinyl ether, ethyl vinyl ether, n-butyl vinyl ether, isobutyl vinyl ether, n-hexyl vinyl ether, phenyl vinyl ether, vinyl chloride, vinyl acetate, vinyl butyrate, and vinyl benzoate); and (d) Olefins (e. g., isobutylene).

Other materials that may be interpolymerized with such esters are isopropenyl methyl ether, vinylidene chloride and isopropenyl acetate.

The preferred group of high polymers comprises the soluble, unsaturated interpolymers of 2-alkenyl or 2-alkenyl-oxyalkyl esters of olefinic polycarboxylic acids with certain monoolefinic 2-alkenyl type compounds selected from the class of 2-alkenyl alcohols, 2-alkenyl chlorides, and mono-2-alkenyl ethers and esters devoid of any further ethylenic or acetylenic unsaturation. Such monoolefinic 2-alkenyl compounds may be represented by the formula $$R'CH=C(R)-CH_2-X$$

wherein each of R and R' is one of the radicals hydrogen, chlorine, methyl, chloromethyl and ethyl, provided that one of R or R' is hydrogen when the other is chlorine, methyl, chloromethyl or ethyl; and X is one of the radicals chlorine, hydroxyl, alkoxy (e. g., methoxy, ethoxy, beta-hydroxyethoxy, propoxy, isopropoxy, n-butoxy, isobutoxy, amyloxy, hexoxy, heptoxy, octoxy, nonoxy, decoxy), aryloxy (e. g., phenoxy, tolyloxy), aralkoxy (e. g., benzyloxy), and acyloxy (e. g., acetoxy, propionoxy, isobutyroxy, valeroxy, benzoyloxy). Illustrative of such compounds are allyl chloride, methallyl chloride, crotyl chloride, 2,3-dichloropropene, 1,4-dichlorobutene-2, 2-(chloromethyl-allyl chloride, allyl alcohol, methallyl alcohol, 2-chloroallyl alcohol, crotyl alcohol, 2-ethallyl alcohol, allyl methyl ether, methallyl ethyl ether, beta-allyloxyethanol, allyl propyl ether, methallyl butyl ether, methallyl amyl ether, methallyl heptyl ether, allyl octyl ether, crotyl ethyl ether, 2-chloroallyl ethyl ether, methallyl phenyl ether, allyl benzyl ether, allyl acetate, 2-chloroallyl propionate, methallyl butyrate, ethallyl valerate and cinnamyl acetate. The allyl-type compounds (allyl, methallyl and ethallyl alcohols, chlorides, esters or ethers) are again preferred because of favorable cost and availability.

This latter class of interpolymers are characterized by their preparative simplicity and by the unusually high conversions of the monomeric reactants to soluble, unsaturated, convertible interpolymers.

High yields of soluble unsaturated resins for use in my invention can likewise be obtained by polymerization of the above 2-alkenyl or 2-alkenoxyalkyl polyolefinic esters in the presence of certain other copolymerizable monoolefinic compounds from the class of crotonaldehyde, monoolefinic aliphatic hydrocarbons having from 4 to 16 carbon atoms (such as pentene-1, cyclohexene and diisobutylene), and trichloroolefins from the class of trichloropropenes, trichlorobutenes, and trichloropentenes (e. g., 3,3,3-trichloropropene, 4,4,4-trichloro-1-butene, and 4,4,4-trichloro-2-methyl-1-butene). In place of these compounds or the previously mentioned allylic alcohols, chlorides, etc., polyhalogenomethanes having at least one bromine atom may be used, e. g., bromotrichloromethane, dibromodichloromethane, tribromomethane, and tetrabromomethane, as well as alkanethiols such as ethanethiol, 1,1-dimethylethanethiol, hexane-1-thiol, and dodecane-1-thiol. The products are obtained by heating, e. g., at temperatures of 60° to 120° C., the polyolefinic 2-alkenyl or 2-alkenyloxyalkyl ester with from 0.2 to ca. 20 molar equivalents of the monoolefinic 2-alkenyl alcohol, chloride, ether or ester, or of crotonaldehyde, trichloromethylalkene, liquid olefinic hydrocarbon, polyhalogenomethene having at least one bromine atom, or from about 0.005 to 0.05 molar equivalents of an alkanethiol, and with from 0.0 to 6.0 molar equivalents of one or more additional monoolefinic copolymerizable compounds such as styrene, methyl methacrylate or vinyl acetate. In this manner a wide variety of soluble convertible resins can be obtained whose stability, toughness and age-resistance especially fit them for use in coating glass by the process of my present invention.

The polymers or copolymers of polyolefinic 2-alkenyl esters or 2-alkenoxyalkyl esters for use in my invention may also be prepared by other methods. For example, a xylene-soluble polymer of a polyolefinic 2-alkenyl ester may be prepared by subjecting the monomeric ester to the action of heat and a peroxidic polymerization catalyst in the presence of a vast excess of a solvent such as carbon tetrachloride, benzene, or xylene, the polymerization being halted, before insoluble polymer is formed, by cooling and by the addition of a polymerization inhibitor such as hydroquinone. The solvent and unreacted monomer may then be removed by conventional methods.

I prefer to employ the copolymers which contain at least 20% of combined polyolefinic ester.

In formulating my new polymer coating compositions, the ammonium fluoride or bifluoride is dispersed uniformly throughout the appropriate unsaturated, convertible polymer and in the presence or absence of suitable solvents, diluents and/or catalysts. This dispersion is preferably effected by grinding, particularly by ball-mill grinding, since I have found that dispersal methods based on the use of mutual solvents are, in general, markedly less effective. I have also discovered that the amount of the ammonium fluoride employed is extremely critical, and is for all practical purposes restricted to the range of from about 0.05% to 5.0% by weight of the polymer employed. Smaller amounts than 0.05% do not effect proper adhesion of the coating to the glass, and amounts in substantial excess of about 5.0% secure little or no further improvement in adhesion and, moreover, deleteriously affect other properties of the coating, particularly the extent and rate of cure. I have also found that in many cases the optimum adhesion to glass is obtained by the use of dispersions of the ammonium fluoride in pigmented (e. g., with titanium dioxide) polymer compositions from the above class and hence such pigmented coating compositions are especially preferred.

Although the application of my new coatings to glass containers has been stressed above, they are also useful on other glass articles such as plate glass and glass fabrics. The latter is of particular importance to the laminated plastics industry and here my polymer compositions can likewise contribute to the high bonding strength required between the glass fibers and the surrounding resin.

The following examples disclose my invention in more detail. All parts are by weight.

EXAMPLE 1

The polymeric material employed is a xylene-soluble, unsaturated, ternary interpolymer obtained by polymerizing a mixture of 23.2 parts of styrene, 40.4 parts of diallyl fumarate and 70.8 parts of allyl alcohol in xylene solution by heating it in the presence of benzoyl peroxide as a catalyst.

Samples of a 50% solution of the thus obtained interpolymer in xylene are ball-milled for 48 hours with 0.5% of each of several fluorides and bifluorides. The resulting dispersions are spread on clean glass panels to a depth sufficient to yield a cured film of about 1 mil thickness. The coated panels are then heated at 400° F. until the coatings are cured to a hard, solvent-resistant state. The film derived from the polymer composition containing ammonium fluoride is very adherent and strongly resists separation from the glass base by a knife blade.

Each of the cured films is then allowed to stand at 25° C. for about 24 hours, after which it is immersed in distilled water at 25° C. for 23 hours, withdrawn and allowed to stand at 25° C. for 1 hour. Then the immersion cycle is repeated until the film fails, as evidenced by cracking, chipping, etc.

The results are tabulated below:

*Table*

| Fluoride Salt in Film | Time (Min.) of Cure at 400° F. | Number of Cycles To Cracking Failure |
|---|---|---|
| (a) None | 20 | <1 |
| (b) Sodium Fluoride | 35 | <1 |
| (c) Sodium Bifluoride | 35 | 3 |
| (d) Ammonium Fluoride | 50 | >16 |
| (e) Ammonium Bifluoride | 35 | 8 |
| (f) Ammonium Silicofluoride | 35 | 5 |

From the table above, the unique effect of ammonium fluoride in promoting adhesion of polyallylic esters to glass is readily apparent. Ammonium bifluoride likewise secures improvement in adhesion. The effect of sodium bifluoride and of ammonium silicofluoride is very minor in comparison with that of ammonium fluoride.

EXAMPLE 2

(a) A mixture of 180 parts of a 50% solution in xylene, of the ternary interpolymer of styrene, diallyl fumarate and allyl alcohol described in Example 1, 90.0 parts of titanium dioxide, 9.0 parts of butyl carbitol acetate, 121.0 parts of xylene and 0.9 part of ammonium fluoride is ball-milled for 48 hours to yield a smooth uniform enamel. This is sprayed on a clean glass plate and baked at 200° C. for 40 minutes whereby a hard, adherent coating is obtained. After standing at 25° C. for 24 hours the enameled plate is subjected to cycles of 23 hours of immersion in distilled water, alternating with one-hour exposures to air in the manner of Example 1. The film has not failed after a total immersion time of 138 hours.

(b) In contrast, a second sample of the same enamel but devoid of ammonium fluoride fails badly after a total of 92 hours of immersion in water.

(c) When the ternary interpolymer of 2–a above is replaced by a commercial urea-alkyd resin and ammonium fluoride is added, the resulting baked film displays adhesion and resistance to water-immersion which are inferior even to those of a similar urea-alkyd film containing no ammonium fluoride.

Having thus described my invention, what I claim and desire to protect by Letters Patent is:

1. A coating composition comprising a xylene-soluble, unsaturated polymerizate selected from the group consisting of homopolymers of polyolefinic esters of 2-alkenols and 2-alkenoxyalkanols, and interpolymers of at least 20% by weight of such polyolefinic esters with a copolymerizable monoolefinic compound, in admixture with a fluoride salt selected from the group consisting of ammonium fluoride and ammonium bifluoride, said fluoride salt being present in an amount within the range of from about 0.05% to 5.0% by weight of the said polymeric material.

2. A coating composition comprising a xylene-soluble, unsaturated interpolymerizate of at least 20% by weight of a 2-alkenyl ester of a 2-alkenoic acid, said ester containing from two to four ethylenic linkages, and a copolymerizable monoolefinic compound, in admixture with a fluoride salt selected from the group consisting of ammonium fluoride and ammonium bifluoride, said fluoride salt being present in an amount within the range of from about 0.05% to 5.0% by weight of the said polymeric material.

3. A coating composition comprising a xylene-soluble, unsaturated interpolymerizate of at least 20% by weight of a 2-alkenyl ester of a saturated polycarboxylic acid, said ester containing from two to four ethylenic linkages, and a copolymerizable monoolefinic compound, in admixture with a fluoride salt selected from the group consisting of ammonium fluoride and ammonium bifluoride, said fluoride salt being present in an amount within the range of from about 0.05% to 5.0% by weight of the said polymeric material.

4. A coating composition comprising a xylene-soluble, unsaturated interpolymerizate of at least 20% by weight of a 2-alkenyl ester of an alpha-olefinic polycarboxylic acid, said ester containing from two to four ethylenic linkages, and a copolymerizable monoolefinic compound, in admixture with a fluoride salt selected from the group consisting of ammonium fluoride and ammonium bifluoride, said fluoride salt being present in an amount within the range of from about 0.05% to 5.0% by weight of the said polymeric material.

5. A coating composition comprising a xylene-soluble, unsaturated interpolymerizate derived from an interpolymerizable mixture containing 1 molar equivalent of a di-2-alkenyl fumarate, from 0.2 to 20 molar equivalents of a monoolefinic 2-alkenyl compound, and from 0 to 8.0 molar equivalents of an additional different monoolefinic copolymerizable compound, in admixture with a fluoride salt selected from the group consisting of ammonium fluoride and ammonium bifluoride, said fluoride salt being present in an amount within the range of from about 0.05% to 5.0% by weight of the said polymeric material.

6. A coating composition comprising a xylene-soluble, unsaturated interpolymerizate derived from an interpolymerizable mixture containing 1 molar equivalent of a di-2-alkenyl fumarate, from 0.2 to 20 molar equivalents of diisobutylene, and from 0 to 8.0 molar equivalents of an additional different monoolefinic copolymerizable compound, in admixture with a fluoride salt selected from the group consisting of ammonium fluoride and ammonium bifluoride, said fluoride salt being present in an amount within the range of from about 0.05% to 5.0% by weight of the said polymeric material.

7. A coating composition comprising a xylene-soluble, unsaturated interpolymerizate derived from an interpolymerizable mixture containing 1 molar equivalent of a di-2-alkenylfumarate, from 0.2 to 20 molar equivalents of a bromo-polyhalogenomethane, and from 0 to 8.0 molar equivalents of an additional different monoolefinic copolymerizable compound, in admixture with a fluoride salt selected from the group consisting of ammonium fluoride and ammonium bifluoride, said fluoride salt being present in an amount within the range of from about 0.05% to 5.0% by weight of the said polymeric material.

8. A coating composition comprising a xylene-soluble, unsaturated interpolymerizate derived from an interpolymerizable mixture containing 1 molar equivalent of diallyl fumarate, from 0.2 to 20 molar equivalents of allyl alcohol, and from 0 to 8.0 molar equivalents of styrene, in admixture with a fluoride salt selected from the group consisting of ammonium fluoride and ammonium bifluoride, said fluoride salt being present in an amount within the range of from about 0.05% to 5.0% by weight of the said polymeric material.

9. A method of securing improved adhesion of xylene-soluble, unsaturated polymeric material to glass surfaces which comprises applying to the glass surface a coating of a composition as set forth in claim 1, and thereafter heating the coated glass at temperatures from 120° C. to 250° C. to secure a highly adherent surface film.

10. A method of securing improved adhesion of xylene-soluble, unsaturated polymeric material to glass surfaces which comprises applying to the glass surface a coating of a composition as set forth in claim 8, and thereafter heating the coated glass at temperatures from 120° C. to 250° C. to secure a highly adherent surface film.

FRANK J. CARLIN.

REFERENCES CITED

The following references are of record in the file of this patent:

UNITED STATES PATENTS

| Number | Name | Date |
|---|---|---|
| 1,672,857 | Blake et al. | June 5, 1928 |
| 2,504,052 | Snyder | Apr. 11, 1950 |